United States Patent
Samukawa

(12) 
(10) Patent No.: US 6,489,417 B1
(45) Date of Patent: *Dec. 3, 2002

(54) PROCESS FOR PRODUCING FLUORINE-CONTAINING ACRYLIC OR METHACRYLIC POLYMERS

(75) Inventor: Hiroshi Samukawa, Tochigi (JP)

(73) Assignee: Sony Chemicals Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,807

(22) Filed: Jun. 4, 1998

(30) Foreign Application Priority Data

Jun. 6, 1997 (JP) .............................. 9-149644

(51) Int. Cl.⁷ .............................. C08F 2/06; C08F 2/14
(52) U.S. Cl. ........................ 526/213; 524/544; 526/242
(58) Field of Search .................. 524/544; 526/213, 526/242

(56) References Cited

U.S. PATENT DOCUMENTS

| | | | |
|---|---|---|---|
| 4,569,962 A | * 2/1986 | Burguette et al. | 524/544 |
| 5,021,501 A | * 6/1991 | Ohmori et al. | 524/544 |
| 5,183,839 A | * 2/1993 | Aharoni | 524/544 |
| 5,284,902 A | 2/1994 | Huber et al. | |
| 5,346,949 A | * 9/1994 | Fukazawa | 524/544 |
| 5,814,698 A | * 9/1998 | Montagna et al. | 524/544 |

FOREIGN PATENT DOCUMENTS

| | | | | |
|---|---|---|---|---|
| EP | 0078598 | * | 5/1983 | 524/544 |
| EP | 0 676 458 A1 | | 10/1995 | |
| JP | 58-208344 | * | 12/1983 | 524/544 |
| JP | 2-206641 | * | 8/1990 | |
| WO | WO 93/20116 | | 10/1993 | |
| WO | WO 98/34967 | | 8/1998 | |

* cited by examiner

*Primary Examiner*—Fred Zitomer
(74) *Attorney, Agent, or Firm*—Rosenthal & Osha L.L.P.

(57) ABSTRACT

A process for producing a fluorine-containing acrylic or methacrylic polymer, comprises polymerizing a fluorine-containing acrylate or methacrylate in a solution phase formed of an organic solvent and dissolved therein a monomer containing a fluorine-containing acrylate or methacrylate having a polyfluoroalkyl group having 6 to 16 carbon atoms. A non-halogen type solvent is used as the organic solvent and the fluorine-containing acrylate or methacrylate is so polymerized that a polymer-containing liquid phase comprised of the fluorine-containing acrylic or methacrylic polymer formed with progress of polymerization and the organic solvent is separated from the solution phase.

This process enables production of a fluorine-containing acrylic or methacrylic polymer having a fluorine monomer in a high proportion by the use of a commonly available general-purpose solvent, without using any fluorine type solvent.

12 Claims, No Drawings

PROCESS FOR PRODUCING FLUORINE-CONTAINING ACRYLIC OR METHACRYLIC POLYMERS

BACKGROUND OF THE INVENTION

1. Field of the Invention

This invention relates to a process for producing a fluorine-containing acrylic or methacrylic polymer.

2. Description of the Related Art

In order to impart good surface properties such as releasability, stainproofing, water repellency and oil repellency to the surfaces of various adherends, it is common to apply coating agents containing a fluorine-containing acrylic or methacrylic polymer.

Such a fluorine-containing acrylic or methacrylic polymer is known to include polymers obtained by polymerizing fluorine monomers such as acrylic or methacrylic acid esters (both herein inclusively "acrylate or methacrylate") having a polyfluoroalkyl group or perfluoroalkyl group having 6 to 16 carbon atoms. In this instance, the fluorine monomers are mostly copolymerized with non-fluorine monomers, and their copolymerization is widely carried out by solution polymerization or emulsion polymerization making use of general-purpose solvents.

Such copolymerization of fluorine monomers with non-fluorine monomers can make resultant copolymers highly soluble in the general-purpose solvents and also can achieved a low material cost, but on the other hand tends to make greatly poor the properties such as releasability and stainproofing that are inherent in fluorine-containing polymers.

Accordingly, when importance is attached to the properties inherent in the fluorine-containing polymers, the fluorine monomer must be used in a large proportion in the total monomer. Usually, the fluorine monomer must be in a proportion of at least 70% by weight in the total monomer.

Now, when polymerization is carried out under such conditions that the proportion of fluorine monomer in the total monomer exceeds 70% by weight, it is not preferable to employ emulsion polymerization which makes use of a surface-active agent in a large quantity. This is because the surface-active agent used may bleed to coating film surfaces to cause a deterioration of surface properties of coating films formed of fluorine-containing polymers.

One may contemplate employing bulk polymerization as one of polymerization methods, which, however, has a problem on the controllability of polymerization reaction, and also has a problem that the polymer is obtained as a hard mass that is difficult to handle, and is apt to turn into a gel when dissolved in a fluorine type solvent. Thus, it is not practical to employ the bulk polymerization.

Accordingly, it follows that solution polymerization is employed when polymerization is carried out under the conditions that the proportion of fluorine monomer in the total monomer exceeds 70% by weight.

In the solution polymerization, it is necessary to use a solvent capable of dissolving the fluorine monomer and also dissolving the fluorine-containing polymer formed. Such a solvent can not be any commonly available general-purpose solvents not capable of dissolving the fluorine-containing polymer, and fluorine type (PFC) or chlorine-fluorine type (CFC) solvents such as trichlorotrifluoroethane, metaxylene hexafluoride, tetrachlorohexafluorobutane and FC-726 (available from 3M) are used (see Japanese Patent Application Laid-open No. 61-23656 and Japanese Patent Publication No. 1-42983).

Since, however, the fluorine type or chlorine-fluorine type solvents are very expensive solvents compared with commonly available general-purpose solvents, there is a problem that they hinder the reduction of production cost for fluorine-containing polymers. To solve this problem, one may contemplate using the fluorine type solvent in a relatively small quantity (e.g., in an amount not more than 200 parts by weight) based on 100 parts by weight of the total monomer. This, however, may cause an increase in solution viscosity with progress of polymerization to not only make agitation very difficult but also make it very difficult to take out the resultant polymer from the reaction vessel.

The fluorine type or chlorine-fluorine type solvents have another problem that they are considered to destroy the ozone shield present in the sky on the earth and cause a rise of the earth s surface temperature. Thus, it is strongly required not to use them for the purpose of the conservation of terrestrial environment.

SUMMARY OF THE INVENTION

The present invention intends to solve the above problems the prior art has had. Accordingly, an object of the present invention is to make it possible to produce a fluorine-containing polymer having the fluorine monomer in a high proportion, by the use of commonly available general-purpose solvents without use of fluorine type solvents and chlorine-fluorine type solvents.

The present inventors have discovered that, when a non-halogen type solvent is used, a polymer-containing liquid phase comprised of (i) a fluorine-containing acrylic or methacrylic polymer formed with progress of polymerization and (ii) an organic solvent, with which the polymer is saturated, can be separated from the solution phase by controlling the type and amount of the solvent used, and when so polymerized as to cause such phase separation the reaction mixture containing the fluorine-containing polymer can be well stirred even when polymerized without use of any fluorine type solvent or chlorine-fluorine type solvent, so that the fluorine-containing polymer can be produced in a good efficiency. Thus, they have accomplished the present invention.

More specifically, the present invention provides a process for producing a fluorine-containing acrylic or methacrylic polymer, which comprises polymerizing a fluorine-containing acrylate or methacrylate in a solution phase formed of an organic solvent and dissolved therein a monomer containing a fluorine-containing acrylate or methacrylate having a polyfluoroalkyl group, wherein;

a non-halogen type solvent is used as the organic solvent and the fluorine-containing acrylate or methacrylate is so polymerized that a polymer-containing liquid phase comprised of the fluorine-containing acrylic or methacrylic polymer formed with progress of polymerization and the organic solvent is separated from the solution phase.

This and other objects, features and advantages of the present invention are described in or will become apparent from the following detailed description of the invention.

DETAILED DESCRIPTION OF THE INVENTION

The present invention will be described below in detail.

The process for producing a fluorine-containing acrylic or methacrylic polymer according to the present invention is a process comprising polymerizing a fluorine-containing acrylate or methacrylate in a solution phase formed of an organic solvent and dissolved therein a monomer containing a fluorine-containing acrylate or methacrylate having a polyfluoroalkyl group.

In this process, a non-halogen type solvent is used as the organic solvent. Hence, the problem on production cost and the problem on terrestrial environment do not occur which may occur when the fluorine type or chlorine-fluorine type solvents are used.

In the production process of the present invention, the fluorine-containing acrylate or methacrylate is so polymerized that a polymer-containing liquid phase comprised of the fluorine-containing acrylic or methacrylic polymer formed with progress of polymerization and the organic solvent is separated from the solution phase which is uniform at the initial stage of the polymerization. Hence, the polymerization reaction can be made to progress in a good efficiency while keeping the polymer from turning into a gel during the reaction. The reason therefor is unclear, and is presumed as follows:

Because of the controlling of the type and amount of the non-halogen type solvent, the reaction mixture that forms a uniform solution phase at the initial stage of the polymerization is separated into two phases, a lower-layer phase and an upper-layer phase. The lower-layer phase is a polymer-containing liquid phase in which the resultant fluorine-containing acrylic or methacrylic polymer is contained in a large quantity and the organic solvent and fluorine monomer stand molten into the polymer in the quantities corresponding to their respective solubility. The upper-layer phase is a solution phase in which the fluorine monomer and an oligomer are dissolved in the organic solvent. Then, the polymerization separately proceeds in each phase, during which the respective components are kept in equilibrium by their diffusing movement, as so presumed.

Having been passed through such a polymerization process, the polymer-containing liquid phase that is rich in the fluorine-containing polymer is kept in a low viscosity during the polymerization reaction irrespective of a very high polymer concentration. Hence, the polymer-containing liquid phase can be stirred with ease until the polymerization is completed, and also the polymer thus formed can be simply taken out from the reaction vessel.

Having been passed through such a polymerization process, the polymer can also be obtained at a rate of polymerization that is high within a controllable range, and also can have a high degree of polymerization, but not so high a degree of polymerization as to turn into a gel. This is presumably because the polymer concentration in the polymer-containing liquid phase is sufficiently high enough to realize a high degree of polymerization, whereas, with regard to the rate of polymerization, the monomers consumed must be fed from the solution phase and hence the rate of their diffusion determines the rate of polymerization, so that the polymerization reaction does not run away. In this sense, the solution phase is presumed to function as a storehouse of monomers after the phase separation.

In addition, having been passed through such a polymerization process, the solution phase at the end of polymerization is comprised of an excess solvent having not completely being dissolved into the polymer formed, the fluorine monomer and the oligomer. Hence, the solution phase can be simply separated from the polymer-containing liquid phase. Also, when the quantity of the organic solvent is set a little smaller, most of the solvent is absorbed in the polymer-containing liquid phase at the end of the polymerization. Hence, the solution phase can be formed in a very small quantity, so that the polymerization reaction can be made to proceed in a good efficiency.

Incidentally, when substantially only the fluorine monomer is used, the polymer-containing liquid phase can be solidified into a waxy mass in many cases in the state it contains the organic solvent. In such cases, the fluorine-containing polymer can be readily taken out of the reaction vessel, and may be pulverized, followed by removal of the organic solvent to obtain a pulverized product of the fluorine-containing polymer with ease.

In the production process of the present invention, usable as the fluorine monomer is a fluorine-containing acrylic or methacrylic polymer having a polyfluoroalkyl group, represented by the following Formula (1) or (2):

  (1)

  (2)

wherein $R_f$ represents a polyfluoroalkyl group and X represents a spacer group.

Here, the polyfluoroalkyl group represented by $R_f$ may preferably have 6 to 16 carbon atoms. This is because those having less than 6 carbon atoms make the resultant polymer tend to dissolve in the general-purpose solvent to make it difficult for the reaction mixture to be separated into the two phase, and those having more than 16 carbon atoms make the monomer itself available only at a greatly high cost to make it difficult to obtain polymers having properties good enough for the cost. Here, as examples of the polyfluoroalkyl group represented by Rf, it may include straight-chain or branched perfluoroalkyl groups represented by the following Formula (3) or (4):

  (3)

  (4)

wherein n is a number of from 5 to 15, and m is a number of from 3 to 13.

It is also possible to use perfluoroalkyl groups a part of the fluorine atoms of which has bee substituted with a hydrogen atom(s).

In the monomer of Formula (1) or (2), there are no particular limitations on the spacer group represented by X, and any spacer groups used in commonly available monomers may be used, including, e.g., an ethylene group and ethyl (N-alkyl)sulfamides represented by Formula (5):

  (5)

wherein p is 3 or 4.

In the present invention, the content of the fluorine monomer, i.e., the fluorine-containing acrylate or methacrylate in the total monomer may be appropriately selected in accordance with the intended properties of the polymer. However, its use in a too small content may not only make it impossible for the polymer-containing liquid phase to be separated, but also make the fluorine-containing polymer itself have poor properties in releasability or the like. Accordingly, it may preferably be in a content of at least 70% by weight, and more preferably at least 90% by weight.

As the non-halogen type solvent used in the present invention as the organic solvent, it is preferable to use an organic solvent having an intermediate solvent power, which is capable of dissolving the fluorine monomer, but is, with respect to the fluorine-containing polymer, neither a good solvent capable of dissolving the polymer in a free ratio nor a poor solvent almost not capable of dissolving the polymer or almost not capable of being dissolved into the polymer.

Such a non-halogen type solvent may include ketones or esters as those preferably usable. In particular, it is preferable to use at least one selected from the group consisting of ethyl acetate, propyl acetate, acetone, methyl ethyl ketone and methyl isobutyl ketone.

To specify any of these non-halogen type solvents, when the SP (solubility parameter) value (Polymer Handbook VII-519, Third Edition, 1989) indicating the degree of polarity is taken into account, a solvent preferably showing an SP value of from 8.0 to 10.5, and more preferably from 8.5 to 9.5, may be used as the non-halogen type solvent. Incidentally, fluorine type solvents commonly show SP values of 8 or below.

Among the non-halogen type solvents having SP values within such a range, those capable of being dissolved into the fluorine-containing polymer in an amount ranging from 10 to 50% by weight at polymerization temperature may preferably be used.

If the non-halogen type solvent is used in a too small quantity, the polymer-containing liquid phase may have so high a viscosity that the reaction mixture can be stirred with difficulty. If it is used in a too large quantity, no practical reaction rate may be attained and also residual monomers and oligomers may be formed in a large quantity. Accordingly, it may preferably be used in an amount of from 10 to 200 parts by weight, and more preferably from 20 to 150 parts by weight, based on 100 parts by weight of the fluorine monomer, the fluorine-containing acrylate or methacrylate.

In the production process of the present invention, a polymerization like the suspension polymerization may be carried out in an atmosphere of inert gas such as nitrogen gas, by the use of a known radical polymerization initiator (e.g., azobisisobutyronitrile, di-t-butyl peroxide and dibenzoyl peroxide) and at a temperature of preferably from 30 to 100° C., and more preferably from 45 to 85° C.

The polymer-containing liquid phase obtained as a result of the above polymerization solidifies upon cooling when the fluorine monomer is in a very large proportion of, e.g., 90% by weight or more, in the total monomer. Accordingly, the product thus solidified may be pulverized to readily obtain a powdery fluorine-containing acrylic or methacrylic polymer.

EXAMPLES

The present invention will be described below in greater detail by giving Examples.

Example 1

Under polymerization conditions as shown in Table 1, 200 g of perfluorooctyl ethyl methacrylate (FM-108, available from Kyoei Chemical Co., Ltd.) and 50 g of ethyl acetate were charged into a 1-liter separable flask having a stirrer and a reflux tube, and were stirred in a hot water bath heated to a temperature of 80° C., during which nitrogen gas was flowed for 30 minutes. Thereafter, 0.6 g of azobisisobutyronitrile (AIBN) dissolved in 6 g of methyl ethyl ketone (MEK) was added to initiate polymerization.

About 50 minutes after the polymerization was initiated, the reaction mixture began to increase in its viscosity, and phase separation was seen in 3 hours after the polymerization was initiated. The reaction mixture was continued to be stirred for further 1 hour as it stood phases-separated, and thereafter the reaction was terminated.

Thereafter, the reaction mixture was cooled to room temperature, and was left for 24 hours as it was. As a result, the lower layer polymer-containing liquid phase solidified into a waxy mass. The solidified product was taken out of the flask to readily obtain, as shown in Table 2 polymerization results, 245 g of a waxy solidified product containing a fluorine-containing polymer. This product contained 20.2% of the solvent. It almost contained neither unreacted perfluorooctyl ethyl methacrylate nor oligomer soluble in the ethyl acetate. Conversion was 99.8%.

A portion of the solidified product obtained was dissolved in a fluorine solvent (FC-726, available from 3M), and the resultant solution was coated on a polyethylene terephthalate (PET) film, followed by drying. As a result, a transparent film having a good mechanical strength was formed.

Meanwhile, in the flask from which the solidified product had been removed, 3 g of a solution phase remained, as shown in Table 2. In this phase, only 0.5 g of unreacted perfluorooctyl ethyl methacrylate and no oligomer were contained.

Examples 2 and 3

Under polymerization conditions as shown in Table 1, in which solvent percentage and reaction time were changed, the procedure of Example 1 was repeated to carry out polymerization.

After the polymerization was completed, the reaction mixture was cooled to room temperature, and was left for 24 hours as it was. As a result, the lower layer polymer-containing liquid phase solidified into a waxy mass. The solidified product was able to be readily taken out of the flask and pulverized.

As also shown in Table 2 polymerization results, conversion was as high as 97% or more in either of Examples 2 and 3.

A portion of the solidified product obtained was dissolved in a fluorine solvent (FC-726, available from 3M), and the resultant solution was coated on a polyethylene terephthalate (PET) film, followed by drying. As a result, a transparent film having a good mechanical strength was formed.

Example 4

Under polymerization conditions as shown in Table 1, in which the ethyl acetate was replaced with MEK, the procedure of Example 1 was repeated to carry out polymerization. The polymer-containing liquid phase solidified into a brittle waxy mass. As the result, good polymerization results were obtained as shown in Table 2.

A portion of the solidified product obtained was dissolved in a fluorine solvent (FC-726, available from 3M), and the resultant solution was coated on a polyethylene terephthalate (PET) film, followed by drying. As a result, a transparent film having a good mechanical strength was formed.

Example 5

Under polymerization conditions as shown in Table 1 and replacing the perfluorooctyl ethyl methacrylate with 2-(perfluoro-9-methyldecyl)ethyl methacrylate, the procedure of Example 1 was repeated to carry out polymerization. As the result, good polymerization results were obtained as shown in Table 2.

A portion of the solidified product obtained was dissolved in a fluorine solvent (FC-726, available from 3M), and the resultant solution was coated on a polyethylene terephthalate (PET) film, followed by drying. As a result, a transparent film having a good mechanical strength was formed.

Examples 6 to 8

Under polymerization conditions as shown in Table 1, in which solvent percentage and reaction time were changed, the procedure of Example 1 was repeated to carry out polymerization. As the result, as shown in Table 2 polymerization results, it was found that the use of the solvent in an amount more than 300% by weight based on the weight of the fluorine monomer tended to result in a lower conversion. For making the conversion higher, it was also found effective to make polymerization time longer.

In Examples 6 and 8, the reaction mixture caused a weight loss of about 18 g and about 33 g, respectively, chiefly because of vaporization of the solvent. Also, the oligomer formed was separated and collected by concentrating the solution phase by means of an evaporator and spreading the resultant concentrate over a filter paper to make the fluorine monomer soaked up with the filter paper.

In Examples 6 and 8, after cooling, the polymer-containing liquid phase turned into a milky viscous liquid.

Comparative Example 1

Under polymerization conditions as shown in Table 1, bulk polymerization was carried out without using any solvent. The radical polymerization initiator used in the same quantity as that in Example 1 was not dissolved in the solvent, but directly added to the fluorine monomer and dispersed therein. As shown in Table 2 polymerization results, the reaction mixture suddenly solidified in 2 hours after the reaction was initiated, and became impossible to stir. The polymer obtained was swellable in a fluorine type solvent (FC-726, available from 3M), but did not dissolved therein.

Comparative Example 2

Under polymerization conditions as shown in Table 1, in which the solvent percentage was made greatly small, the procedure of Example 1 was repeated to carry out polymerization. As the result, as shown in Table 2 as polymerization results, the polymer-containing liquid phase did not separate from the solution phase, and came into a rubbery state in about 2 hours after the reaction was initiated, to become impossible to stir. The polymer obtained was soluble in a fluorine type solvent (FC-726, available from 3M), but it took a very long time for the polymer to dissolve in it, and was found to be a polymer problematic in practical use.

Comparative Example 3

Under polymerization conditions as shown in Table 1, in which only a fluorine type solvent (FC-726, available from 3M) was used as the solvent, the procedure of Example 1 was repeated to carry out polymerization. As the result, as shown in Table 2 polymerization results, the reaction mixture abruptly increased in viscosity in about 2 hours after the reaction was initiated, and shortly became impossible to stir. At this stage, the fluorine type solvent was further added to provide a solvent percentage of 267% by weight, so that the reaction mixture became possible to stir.

As can be seen from this fact, when the fluorine type solvent is used alone, which is available in a fairly higher price than the general-purpose solvents, it must be used in an amount twice or more that of the fluorine monomer. Thus, it is seen that the use of the fluorine type solvent alone, which of course worsens the problem of terrestrial environment, makes it difficult to reduce production cost.

TABLE 1

| | Polymerization Conditions | | | | |
|---|---|---|---|---|---|
| | Fluorine | Solvent | | Reaction | Reaction |
| | monomer (g) | weight (g) | percentage (%) | time (hr) | temperature (° C.) |
| Example: | | | | | |
| 1 | 200 | 56 | 28*⁰ | 4 | 77 |
| 2 | 200 | 106 | 53*⁰ | 9.5 | 77 |
| 3 | 200 | 206 | 103*⁰ | 11 | 77 |
| 4 | 75 | 50 | 67*¹ | 12 | 79 |
| 5 | 20 | 13 | 65*² | 12 | 77 |
| 6 | 140 | 286 | 204*⁰ | 24 | 77 |
| 7 | 140 | 426 | 304*⁰ | 12 | 77 |
| 8 | 140 | 426 | 304*⁰ | 24 | 77 |
| Comparative Example: | | | | | |
| 1 | 200 | — | — | 2 | —*⁴ |
| 2 | 200 | 16 | 8*⁰ | 2 | —*⁴ |
| 3 | 75 | 100 | 133*³ | 3 | 56 |

Notes of Table 1:
*⁰: Ethyl acetate containing 6 g of MEK is used as the organic solvent.
*¹: Ethyl acetate is used alone as the organic solvent.
*²: Ethyl acetate containing 3 g of MEK is used as the organic solvent.
*³: Fluorine type solvent (FC-726, available from 3M) is used alone as the organic solvent.
*⁴: Unmeasurable because the reaction product turns into a mass.

TABLE 2

| | Polymerization Results | | | | | |
|---|---|---|---|---|---|---|
| | Polymer-containing liquid phase | | Solution phase | | | |
| | Total weight (g) | Solvent content (%) | Total weight (g) | Monomer content (g) | Oligomer content (g) | Conversion*⁵ (%) |
| Example: | | | | | | |
| 1 | 245 | 20.2 | 3 | 0.5 | — | 99.8 |
| 2 | 274 | 27.9 | 19 | 0.7 | — | 99.7 |
| 3 | 266 | 26.8 | 122 | 5.3 | — | 97.4 |
| 4 | 90 | 18.1 | 44 | 1.2 | — | 98.4 |
| 5 | 25 | 25.6 | 8 | 0.1 | — | 99.5 |
| 6 | 148 | 21.5 | 260 | 13.8 | 10 | 90.1 |

TABLE 2-continued

Polymerization Results

| | Polymer-containing liquid phase | | Solution phase | | | |
|---|---|---|---|---|---|---|
| | Total weight (g) | Solvent content (%) | Total weight (g) | Monomer content (g) | Oligomer content (g) | Conversion*5 (%) |
| 7 | 113 | 23.9 | 438 | 54 | — | <61 |
| 8 | 133 | 22.3 | 400 | 19.5 | 17.2 | 86.1 |

Comparative Example:

| 1 | Suddenly solidified after 2 hours without separation into the two phase. |
|---|---|
| 2 | Turned rubbery after 2 hours without separation into the two phase. |
| 3 | Viscosity increased after 30 minutes without phase separation, and became impossible to stir. |

Notes of Table 2
*5: Conversion (%) = 100 × {(amount of charged monomer) − (amount of residual monomer)}/amount of monomers Example 9

Under polymerization conditions as shown in Table 3, the procedure of Example 1 was repeated to carry out polymerization, except that 37.5 g of perfluorooctyl ethyl methacrylate (FM-108, available from Kyoei Chemical Co., Ltd.) and 12.5 g of methoxypolyethylene glycol methacrylate [130MA (EO-addition molar number n: about 9), available from Kyoei Chemical Co., Ltd.] were dissolved in 20 g of ethyl acetate, and 0.15 g of azobisisobutyronitrile (AIBN) dissolved in 3 g of methyl ethyl ketone (MEK) was further added.

During the polymerization, the reaction proceeded in the state the reaction mixture separated into a little-part upper layer (the solution phase) and a greater-part lower layer (the polymer-containing liquid phase). Upon lapse of 12 hours after the reaction was initiated, 50 g of ethyl acetate was further added to the reaction mixture for the purpose of making the state of phase separation clear, followed by cooling to room temperature. As the result, as shown in Table 4 polymerization results, 55 g of the solution phase and 68 g of the polymer-containing liquid phase were obtained in the state of equilibrium. The polymer-containing liquid phase thus obtained (a transparent viscous liquid) was coated on a polyethylene terephthalate (PET) film, followed by drying. As a result, a transparent film having a good mechanical strength was formed.

Incidentally, the polymer-containing liquid phase obtained was a transparent and viscous liquid.

Also, it did not solidify into a waxy mass even when left for a few days.

Example 10

Under polymerization conditions as shown in Table 3, the procedure of Example 9 was repeated to carry out polymerization, except that 45 g of perfluorooctyl ethyl methacrylate (FM-108, available from Kyoei Chemical Co., Ltd.) and 5 g of methoxypolyethylene glycol methacrylate [130MA (EO-addition molar number n: about 9), available from Kyoei Chemical Co., Ltd.] were dissolved in 50 g of ethyl acetate.

During the polymerization, the reaction proceeded in the state the reaction mixture separated into an upper layer (the solution phase) and a lower layer (the polymer-containing liquid phase). Upon lapse of 12 hours after the reaction was initiated, the reaction was terminated, followed by cooling to room temperature. As the result, as shown in Table 4 polymerization results, 40 g of the solution phase and 63 g of the polymer-containing liquid phase were obtained. The polymer-containing liquid phase thus obtained was coated on a polyethylene terephthalate (PET) film, followed by drying. As a result, a transparent film having a good mechanical strength was formed.

Incidentally, the polymer-containing liquid phase obtained was a little opaque and had a blue color and light-scattering properties. Also, it did not solidify into a waxy mass even when left for a few days.

Comparative Example 4

Under polymerization conditions as shown in Table 3, the procedure of Example 9 was repeated to carry out polymerization, except that 25 g of perfluorooctyl ethyl methacrylate (FM-108, available from Kyoei Chemical Co., Ltd.) and 25 g of methoxypolyethylene glycol methacrylate [130MA (EO-addition molar number n: about 9), available from Kyoei Chemical Co., Ltd.] were dissolved in 20 g of ethyl acetate.

During the polymerization, the reaction mixture did not separate into an upper layer (the solution phase) and a lower layer (the polymer-containing liquid phase). After 5 hours, it began to turn into a gel and became difficult to stir. Accordingly, 50 g of ethyl acetate was added, but the reaction mixture was not phase-separated, and turned into a gel on the whole, until it became difficult to stir. Hence, the reaction was stopped.

Comparative Example 5

Under polymerization conditions as shown in Table 3, the procedure of Example 1 was repeated to carry out polymerization, except that 75 g of ethyl acetate was added to a mixture of 50 g of perfluorooctyl ethyl methacrylate (FM-108, available from Kyoei Chemical Co., Ltd.) and 50 g of methyl methacrylate and 0.3 g of azobisisobutyronitrile (AIBN) dissolved in 3 g of methyl ethyl ketone (MEK) was further added.

The reaction proceeded in the state of a transparent and uniform solution, and the reaction mixture was not phase-separated. Upon lapse of 2 hours after the reaction was initiated, the reaction mixture gradually became difficult to stir, and hence the reaction was carried out while stepwise adding ethyl acetate so as to make the reaction mixture have a viscosity low enough to be stirred, and was continued for 12 hours. The ethyl acetate added was finally in an amount of 150 g.

The reaction mixture obtained was a transparent and highly viscous liquid, but the solvent had to be used in an amount of 225% by weight based on the weight of the monomers.

TABLE 3

Polymerization Conditions

|  | Monomer ratio Fluorine monomer/ other monomer | Solvent | | | Reaction time (hr) |
|---|---|---|---|---|---|
|  |  | During polymerization (g) | Post = addition (g) | Solvent percentage (%) |  |
| Example: |  |  |  |  |  |
| 9 | 75/25 | 23 | 50 | 146 | 12 |
| 10 | 90/10 | 53 | 0 | 106 | 12 |
| Comparative Example: |  |  |  |  |  |
| 4 | 50/50 | 23 | 50 | 146 | 12 |
| 5 | 50/50 | 78 | 150 | 228 | 12 |

TABLE 4

Polymerization Results

| | Polymer-containing liquid phase | | Solution phase | |
|---|---|---|---|---|
| | Total weight (g) | Solvent content (%) | Total weight (g) | Content of monomer + oligomer (g) |
| Example: | | | | |
| 9 | 65 | 42.9 | 58 | 4.5 |
| 10 | 63 | 29.9 | 40 | 1.5 |
| Comparative Example: | | | | |
| 4 | The reaction proceeded without phase separation | | | |
| 5 | The reaction proceeded without phase separation. | | | |

As described above, the process for producing a fluorine-containing acrylic or methacrylic polymer according to the present invention enables production of a fluorine-containing acrylic or methacrylic polymer having the fluorine monomer in a high proportion by the use of a commonly available general-purpose solvent, without using any fluorine type solvent.

The entire disclosure of the specification, Claims and summary of the Japanese Patent Application No. 9-149644 filed on Jun. 6, 1997 is herein incorporated by reference in its entirety.

What is claimed is:

1. A process for producing a fluorine-containing acrylic or methacrylic polymer, the process consisting of:
    dissolving a fluorine-containing acrylate or methacrylate monomer having a perfluoroalkyl group into a non-halogen type organic solvent to form a solution phase, such that a solvent percentage of the non-halogen type organic solvent to the fluorine-containing acrylate or methacrylate monomer is from 28% to 304%;
    polymerizing, at a temperature from 30° C. to 100° C., the fluorine-containing acrylate or methacrylate monomer dissolved in the non-halogen type organic solvent to form a polymer liquid phase comprised of the fluorine-containing acrylic or methacrylic polymer so that the solution phase and the polymer liquid phase separate during polymerization; and
    cooling the polymer liquid phase to solidify the fluorine-containing acrylic or methacrylic polymer.

2. The process according to claim 1, wherein said fluorine-containing acrylate or methacrylate monomer comprises 70% by weight or more of total monomer weight.

3. The process according to claim 1, wherein said fluorine-containing acrylate or methacrylate comprises 90% by weight or more of total monomer weight.

4. The process according to claim 1, wherein said non-halogen type solvent is a ketone or an ester.

5. The process according to claim 4, wherein said non-halogen type solvent is selected from the group consisting of ethyl acetate, propyl acetate, acetone, methyl ethyl ketone and methyl isobutyl ketone.

6. The process according to claim 1, wherein said non-halogen type solvent has an SP value of from 8.0 to 10.5.

7. The process according to claim 6, wherein said non-halogen type solvent dissolves into said fluorine-containing acrylic or methacrylic polymer-containing solute in an amount ranging from 10% by weight to 50% by weight at polymerization temperature.

8. The process according to claim 1, wherein said non-halogen type solvent is used in an amount of from 10 parts by weight to 200 parts by weight based on 100 parts by weight of the fluorine-containing acrylate or methacrylate monomer.

9. The process according to claim 1, wherein said non-halogen type solvent is used in an amount of from 20 parts by weight to 150 parts by weight based on 100 parts by weight of the fluorine-containing acrylate or methacrylate monomer.

10. The process according to claim 1, wherein the polymerizing is carried out in an atmosphere of an inert gas and by using a radical polymerization intiator.

11. The process according to claim 10, wherein the polymerization temperature is from 45° C. to 85° C.

12. The process according to claim wherein the fluorine-containing acrylate or methacrylate polymer is pulverized to obtain a powdery fluorine-containing acrylic or methacrylic polymer.

* * * * *